(12) United States Patent
Benitz et al.

(10) Patent No.: US 6,290,504 B1
(45) Date of Patent: Sep. 18, 2001

(54) METHOD AND APPARATUS FOR REPORTING PROGRESS OF A SUBJECT USING AUDIO/VISUAL ADAPTIVE TRAINING STIMULII

(75) Inventors: Angela Jane Benitz, San Francisco; Elizabeth H. Budra, Albany; William M. Jenkins, Pacifica; John J. Montgomery, Oakland, all of CA (US)

(73) Assignee: Scientific Learning Corp., Berkely, CA (US)

( * ) Notice: Subject to any disclaimer, the term of this patent is extended or adjusted under 35 U.S.C. 154(b) by 0 days.

(21) Appl. No.: 09/415,885

(22) Filed: Oct. 8, 1999

Related U.S. Application Data

(63) Continuation-in-part of application No. 09/089,149, filed on Jun. 2, 1998, which is a continuation-in-part of application No. 08/982,189, filed on Dec. 17, 1997, now Pat. No. 5,927,988.

(51) Int. Cl.[7] .................................................. G09B 19/04
(52) U.S. Cl. ......................... 434/185; 434/169; 434/236; 434/307 R; 704/260; 705/17
(58) Field of Search ..................................... 434/118, 156, 434/169, 116, 236, 307 R, 308, 362, 323, 157, 365, 322; 704/1, 9, 254, 270.1, 270, 260, 241, 213; 705/17; 381/34

(56) References Cited

U.S. PATENT DOCUMENTS

| | | | |
|---|---|---|---|
| 5,640,490 | * 6/1997 | Hansen et al. ......................... | 704/254 |
| 5,692,906 | * 12/1997 | Corder ................................. | 434/156 |
| 5,729,694 | * 3/1998 | Holzrichter et al. ................. | 705/17 |
| 5,860,064 | * 1/1999 | Henton ................................ | 704/260 |
| 5,885,083 | * 3/1999 | Ferrell ................................ | 434/156 |
| 5,957,699 | * 9/1999 | Peterson et al. ..................... | 434/350 |
| 6,109,107 | * 8/2000 | Wright et al. ........................ | 73/585 |
| 6,120,298 | * 9/2000 | Jenkins et al. ...................... | 434/236 |
| 6,146,147 | * 11/2000 | Wasowicz ........................... | 434/169 |

* cited by examiner

*Primary Examiner*—Joe H. Cheng
(74) *Attorney, Agent, or Firm*—James W. Huffman

(57) ABSTRACT

An apparatus and method on a computing device for training of auditory and graphical discrimination in humans is provided. The method and apparatus provides a number of stimulus sets, each stimulus set having a number of different phonemes. Speech processing is used to provide multiple levels of emphasis and or stretching for enhancing a subject's ability to discriminate between similarly sounding phonemes. The processing is applied to phonemes and presented to the human as a trial. As a subject correctly identifies phonemes in the stimulus sets, the amount of processing applied to the phonemes is reduced, ultimately to the level of normal speech. A performance feedback mechanism is provided to allow the human to obtain a summary of his/her success over the stimulus sets, at the different processing levels. More detailed feedback is also provided indicating specific processing levels achieved for each of the stimulus sets. Selection buttons are provided on a graphical interface to allow the human to hear a stimulus set at his beginning processing level, and at his currently obtained processing level.

6 Claims, 9 Drawing Sheets

METHOD AND APPARATUS FOR REPORTING PROGRESS OF A SUBJECT USING AUDIO/VISUAL ADAPTIVE TRAINING STIMULII

CROSS REFERENCE TO RELATED APPLICATIONS

This application is a Continuation-in-Part of co-pending U.S. patent application Ser. No. 09/089,149, filed Jun. 2, 1998, entitled "METHOD AND APPARATUS FOR TRAINING OF AUDITORY/VISUAL DISCRIMINATION USING TARGET AND DISTRACTOR PHONEMES/ GRAPHEMES", which is a Continuation-In-Part of U.S. patent application Ser. No. 08/982,189, filed Dec. 17, 1997, entitled "METHOD AND APPARATUS FOR TRAINING OF SENSORY AND PERCEPTUAL IN LLI SUBJECTS", now U.S. Pat. No. 5,927,988.

BACKGROUND OF THE INVENTION

1. Field of the Invention

This invention relates in general to the field of language education, and more specifically to a computer program for training a human's auditory processing system to discriminate between and accurately identify similarly sounding phonemes or words, and to associate representative graphemes with the phonemes or words.

2. Description of the Related Art

Up to ten percent of children have language-learning impairments (LLI) resulting from the inability to accurately process short duration acoustic events at the rates that occur in normal speech. Their trouble distinguishing among elements of speech is neurologically based and has far reaching consequences, including: academic failure, emotional and disciplinary problems, and possibly diminished lifelong achievement and self-image. No bracket of intelligence, race, gender or economic level is immune from this problem.

More specifically, Children with LLI have difficulty detecting and identifying sounds that occur simultaneously or in cloge proximity to each other—a phenomenon known as "masking." Because of masking, children with LLI require sounds that are as much as 45 decibels more intense than a preceding or subsequent masking noise to distinguish and understand them. In addition, children with LLI are consistently poorer at detecting a brief tone presented with a masking noise, particularly when the brief tone is turned on immediately prior to the masking noise. This phenomenon is called "backward masking." Similarly, when the brief tone is turned on immediately after the masking noise a similar decrease in detectability can occur. This phenomenon is called "forward masking". For a tone to be detected by a child with LLI in the presence of a masking noise, the tone must be separated in time or frequency from the masking noise.

The inability to accurately distinguish and process short duration sounds often causes children to fall behind in school. Since the children can't accurately interpret many language sounds, they can't remember which symbols represent which sounds. This deficiency causes difficulties in learning to read (translating from symbols to sounds), and in spelling. In fact, it is common for a child with LLI to fall two to three years behind his/her peers in speech, language and reading development.

One way children develop such auditory processing problems is from middle ear infections when they are young and beginning to develop the oral representations of language in the central auditory nervous system. When a child has an ear infection, fluid can build up and block or muffle the sound wave entering the ear causing intermittent hearing loss. Even if the infection doesn't permanently damage the ear, the child's brain doesn't learn to process some sounds because it hasn't heard them accurately before, on a consistent basis. This typically occurs during a critical period of brain development when the brain is building the nerve connections necessary to accurately process acoustic events associated with normal speech.

Researchers believe that the auditory processing problem is essentially one of timing. Vowel sounds like /a/ and /e/ usually last at least 100 milliseconds and typically have constant frequency content. Consonants, on the other hand, typically have modulated frequency components, and last less than 40 milliseconds. Children with LLI cannot process these faster speech elements, especially the hard consonants like /t/, /p/, /d/ and /b/, if they occur either immediately before or after vowels, or if they are located near other consonants. Rather than hearing the individual sounds that make up a particular phoneme, children with LLI integrate closely associated sounds together over time. Since the duration of vowels are typically longer than consonants, the modulated frequency portions of consonants are often lost in the integration, an affect that may also hinder the resolution of the vowel, particularly short duration vowels.

This problem of abnormal temporal integration of acoustic events over time is not limited to children with LLI. Rather, the problem extends to stroke victims who have lost the neurological connections necessary to process speech, as well as to individuals raised in one country, having one set of language phonemes, and attempting to learn the language of another country, having a distinct set of language phonemes. For example, it is known that an individual raised in Japan is not often presented with phonemes similar to the English r's and l's, because those consonants are not common in the Japanese language. Similarly, there are many subtleties in the sounds made by a speaker of Japanese that are difficult to distinguish unless raised in Japan. The phonetic differences between languages are distinctions that must be learned, and are often very difficult. But, they are clearly problems that relate to the temporal processing of short duration acoustic events.

The above-described temporal processing deficiency has little if anything to do with intelligence. In fact, some LLI specialists argue that brains choosing this different route by which to absorb and reassemble bits of speech may actually stimulate creative intelligence, but at the expense of speech and reading problems.

Recent studies have shown that if the acoustic events associated with phonemes that are difficult to distinguish, such as /ba/ and /da/, are slowed down, or that the consonant portion of the phonemes are emphasized, that students diagnosed as LLI can accurately distinguish between the phonemes. In addition, if the interval between two complex sounds is lengthened, LLI students are better able to process the sounds distinctly.

Heretofore, the solution to the processing problem has been to place LLI students in extended special education and/or speech therapy training programs that focus on speech recognition and speech production. Or, more commonly, repetitive reading programs, phonic games, or other phonic programs are undertaken. These programs often last for years, with a success rate that is often more closely associated with the skill of the speech and language professional than with the program of study.

What is needed is a method and apparatus that allows a subject with abnormal temporal processing to train, or retrain their brain to recognize and distinguish short duration acoustic events that are common in speech. Moreover, what is needed is a program that repetitively trains a subject to distinguish phonemes at a normal rate, by emphasizing elements of speech to the point that they are distinguishable, or separating speech elements in time, and then adaptively adjusting the emphasis and separation of the speech elements to the level of normal speech. The adaptive adjustments should be made so as to encourage the subject to continue with the repetitions, and the number of repetitions should be sufficient to develop the necessary neurological connections for normal temporal processing of speech. Moreover, the program should provide acoustic signals to the brain that are better for phonetic training than normal human speech.

Furthermore, what is needed is a program that trains a subject to discriminate between similar phonemes in increasingly complex situations (i.e., identifying sounds at the beginning, middle and end of words), to identify sequences of stimuli that are delivered in rapid succession (i.e., at speeds common in normal speech), and to begin associating phonemes with particular graphic representations (graphemes).

In addition, what is needed is a system for reporting to the user their performance over the course of his/her training. The system should provide general performance feedback, as well as detailed information regarding their ability to discriminate between similar phonemes.

SUMMARY

To address the above-detailed deficiencies, the present invention provides a method on a computing device for providing performance feedback to a subject, the feedback related to games that are used to train the subject's sensory perceptual system. The method includes: providing the games to a subject for play on the computing device, each of the games having a number of skill levels; recording advancement of skill levels by the subject for each of the games; and presenting performance feedback via the computing device indicating how the subject is performing in each of the games.

In another aspect, the present invention provides a method on a computing device for adaptively developing neural activity in a subject, to improve the subject's signal differentiation in spoken language, the method utilizing speech processing for enhancing the subject's ability to distinguish between similar phonemes, the method using a plurality of stimulus sets. The method includes: presenting trials to the subject, the trials requiring the subject to indicate a response, the response being correct or incorrect for each trial; recording for each trial, whether the response was correct or incorrect; and graphically presenting to the subject a chart illustrating their performance for the stimulus sets.

In yet another aspect, the present invention provides a computer program for execution on a computing device, the program for improving a subject's discrimination of phonemes within spoken language, the phonemes modified by the computing device. The computer program has a number of a training skill levels, a graphical interface, an acoustic processor, a recording program, and a performance feedback program. The training skill levels differ from each other in the amount of audio processing applied to the phonemes. The graphical interface presents as trials the plurality of training skill levels to the subject. The acoustic processor acoustically presents to the subject for each trial, via the computing device, within each of the training skill levels, phonemes for identification. The recording program records for each trial whether the subject correctly or incorrectly identified the phonemes. The performance feedback program visually indicates to the subject their progress in the training skill levels.

BRIEF DESCRIPTION OF THE DRAWINGS

These and other objects, features, and advantages of the present invention will become better understood with regard to the following description, and accompanying drawings where.

DETAILED DESCRIPTION

Figure 1:
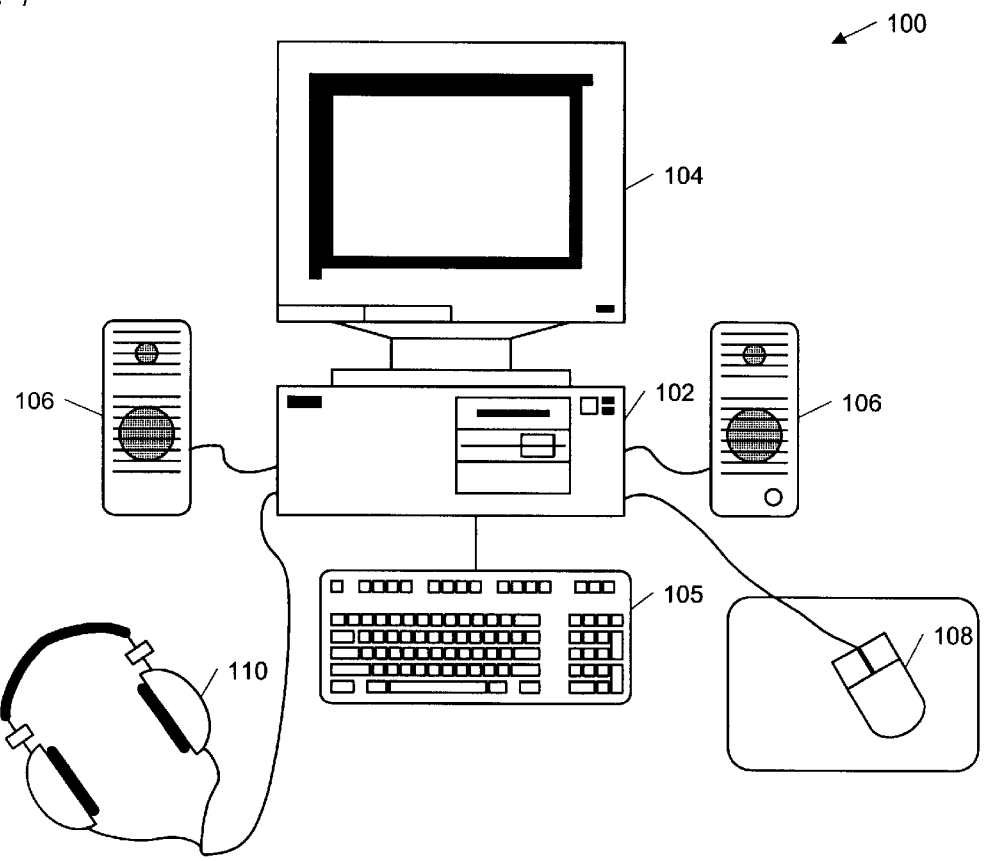
FIG. 1 is a block diagram of a computer system for executing a program according to the present invention.

Referring to FIG. 1, a computer system 100 is shown for executing a computer program to train, or retrain a subject, according to the present invention. The computer system 100 contains a computer 102, having a CPU, memory, hard disk and CD ROM drive (not shown), attached to a monitor 104. The monitor 104 provides visual prompting and feedback to the subject during execution of the computer program. Attached to the computer 102 are a keyboard 105, speakers 106, a mouse 108, and headphones 110. The speakers 106 and the headphones 110 provide auditory prompting and feedback to the subject during execution of the computer program. The mouse 108 allows the subject to navigate through the computer program, and to select particular responses after visual or auditory prompting by the computer program. The keyboard 105 allows an instructor to enter alpha numeric information about the subject into the computer 102. Although a number of different computer platforms are applicable to the present invention, embodiments of the present invention execute on either IBM compatible computers or Macintosh computers.

Figure 2:
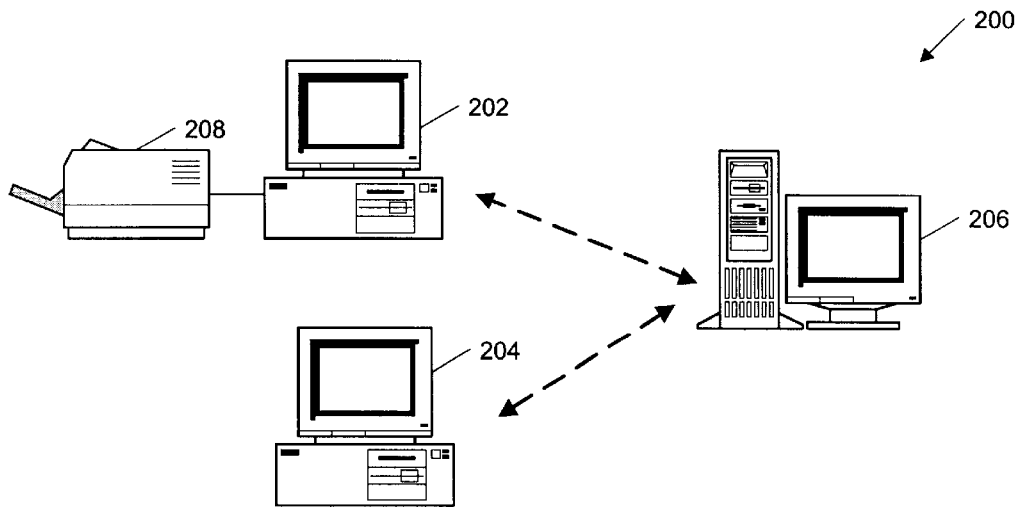
FIG. 2 is a block diagram of a computer network for executing a program according to the present invention.

Now referring to FIG. 2, a computer network 200 is shown. The computer network 200 contains computers 202, 204, similar to that described above with reference to FIG. 1, connected to a server 206. The connection between the computers 202, 204 and the server 206 can be made via a local area network (LAN), a wide area network (WAN), or via modem connections, directly or through the Internet. A printer 208 is shown connected to the computer 202 to illustrate that a subject can print out reports associated with the computer program of the present invention. The computer network 200 allows information such as test scores, game statistics, and other subject information to flow from a subject's computer 202, 204 to a server 206. An administrator can then review the information and can then download configuration and control information pertaining to a particular subject, back to the subject's computer 202, 204.

Before providing a detailed description of the present invention, a brief overview of certain components of speech will be provided, along with an explanation of how these components are processed by LLI subjects. Following the overview, general information on speech processing will be provided so that the reader will better appreciate the novel aspects of the present invention.

Figure 3:
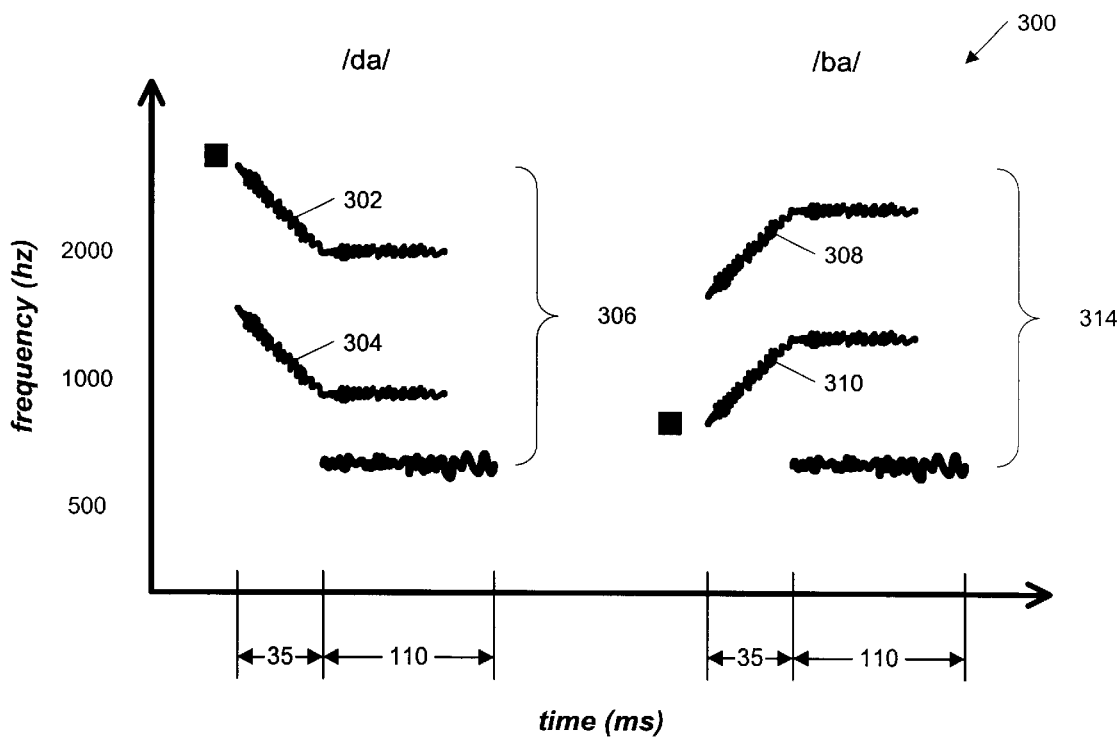
FIG. 3 is a chart illustrating frequency/energy characteristics of two phonemes within the English language.

Referring to FIG. 3, a chart is shown that illustrates frequency components, over time, for two distinct phonemes within the English language. Although different phoneme combinations are applicable to illustrate features of the present invention, the phonemes /da/ and /ba/ are shown. For the phoneme /da/, a downward sweep frequency component 302, at approximately 2.5–2 khz is shown to occur over a 35 ms interval. In addition, a downward sweep frequency component 304, at approximately 1 khz is shown to occur during the same 35 ms interval. At the end of the 35 ms interval, constant frequency components 306 are shown, whose duration is approximately 110 ms. Thus, in producing the phoneme /da/, the stop consonant portion of the element /d/ is generated, having high frequency sweeps of short duration, followed by a long vowel element /a/ of constant frequency.

Also shown are frequency components for a phoneme /ba/. This phoneme contains an upward sweep frequency component 308, at approximately 2 khz, having a duration of approximately 35 ms. The phoneme also contains an upward sweep frequency component 310, at approximately 1 khz, during the same 35 ms period. Following the stop consonant portion /b/ of the phoneme, are constant frequency vowel portions 314 whose duration is approximately 110 ms.

Thus, both the /ba/ and /da/ phonemes begin with stop consonants having modulated frequency components of relatively short duration, followed by a constant frequency vowel components of longer duration. The distinction between the phonemes exists primarily in the 2 khz sweeps during the initial 35 ms interval. Similarity exists between other stop consonants such as /ta/, /pa/, /ka/ and /ga/.

Figure 4:
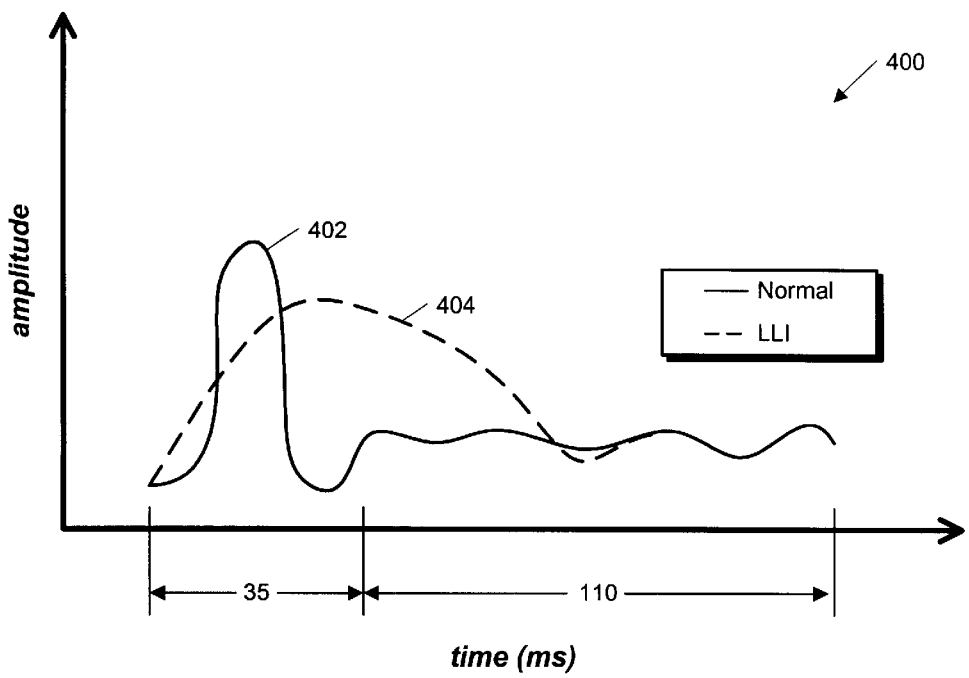
FIG. 4 is a chart illustrating auditory reception of a phoneme by a subject having normal receptive characteristics, and by a subject whose receptive processing is impaired.

Referring now to FIG. 4, the amplitude of a phoneme, for example /ba/, is viewed in the time domain. A short duration high amplitude peak waveform 402 is created upon release of either the lips or the tongue when speaking the consonant portion of the phoneme, that rapidly declines to a constant amplitude signal of longer duration. For an individual with normal temporal processing, the waveform 402 will be understood and processed essentially as it is. However, for an individual who is learning-language impaired, or who has abnormal temporal processing, the short duration, higher frequency consonant burst will be integrated over time with the lower frequency vowel, and depending on the degree of impairment, will be heard as the waveform 404. The result is that the information contained in the higher frequency sweeps associated with consonant differences, will be muddled, or indistinguishable.

With the above general background of speech elements, and how LLI subjects process them, a general overview of speech processing will now be provided. As mentioned above, one problem that exists in LLI subjects is the inability to distinguish between short duration acoustic events. If the duration of these acoustic events is stretched, in the time domain, it is possible to train LLI subjects to distinguish between these acoustic events. An example of such time domain stretching is shown in FIG. 5, to which attention is now directed.

Figure 5:
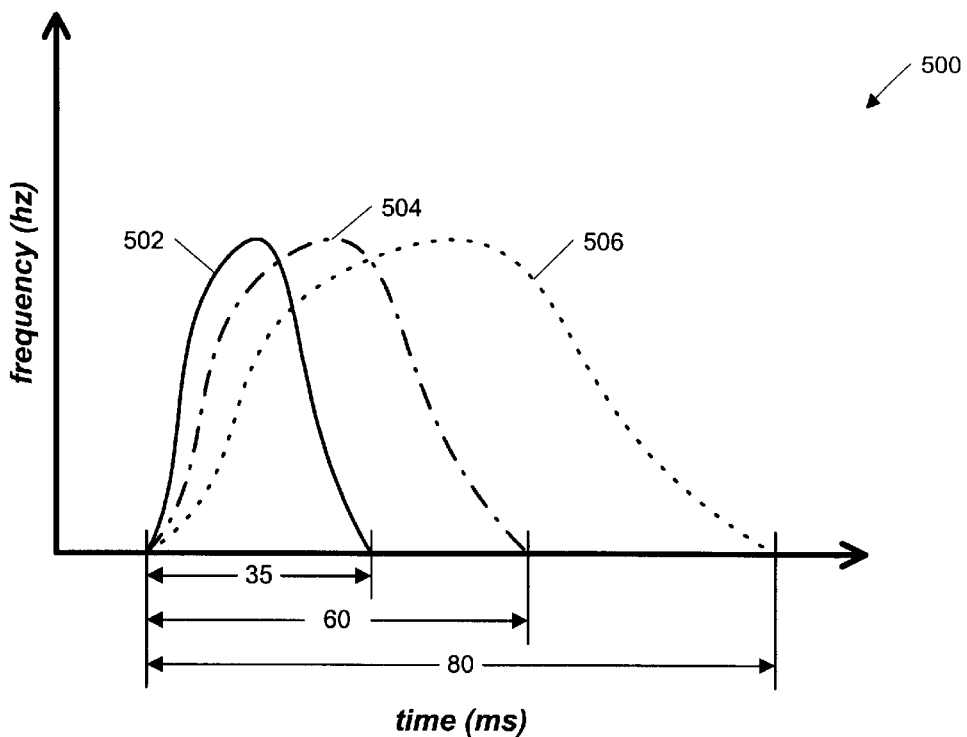
FIG. 5 is a chart illustrating stretching of a frequency envelope in time, according to the present invention.

In FIG. 5, a frequency vs. time graph 500 is shown that illustrates a waveform 502 having short duration characteristics similar to the waveform 402 described above. Using existing computer technology, the analog waveform 502 can be sampled and converted into digital values. The values can then be manipulated so as to stretch the waveform in the time domain to a predetermined length, while preserving the amplitude and frequency components of the modified waveform. The modified waveform can then be converted back into an analog waveform for reproduction by a computer, or by some other audio device. The waveform 502 is shown stretched in the time domain to durations of 60 ms (waveform 504), and 80 ms (waveform 506). By stretching the consonant portion of the waveform 502 without effecting its frequency components, subjects with LLI can begin to hear distinctions in common phonemes.

Figure 6:
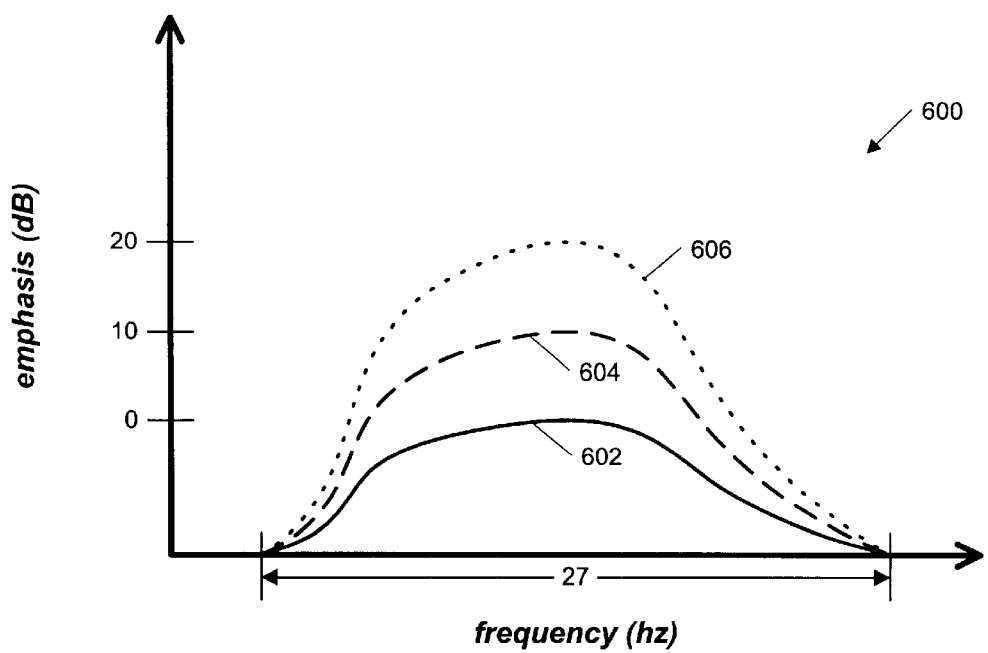
FIG. 6 is a chart illustrating emphasis of selected frequency components, according to the present invention.

Another method that may be used to help LLI subjects distinguish between phonemes is to emphasize selected frequency envelopes within a phoneme. Referring to FIG. 6, a graph 600 is shown illustrating a frequency envelope 602 whose envelope varies by approximately 27 hz. By detecting frequency modulated envelopes that vary from say 3–30 hz, similar to frequency variations in the consonant portion of phonemes, and selectively emphasizing those envelopes, they are made more easily detectable by LLI subjects. A 10 dB emphasis of the envelope 602 is shown in waveform 604, and a 20 dB emphasis in the waveform 606.

Figure 7:
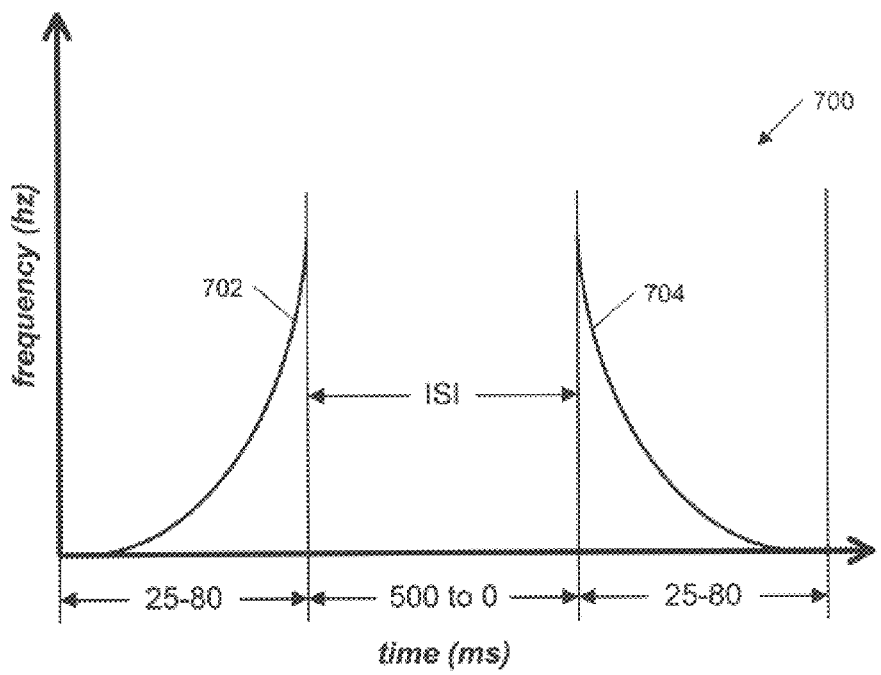
FIG. 7 is a chart illustrating up-down frequency sweeps of varying duration, separated by a selectable inter-stimulus-interval (ISI), according to the present invention.

A third method that may be used to train LLI subjects to distinguish short duration acoustic events is to provide frequency sweeps of varying duration, separated by a predetermined interval, as shown in FIG. 7. More specifically, an upward frequency sweep 702, and a downward frequency sweep 704 are shown, having duration's varying between 25 and 80 milliseconds, and separated by an inter-stimulus interval (ISI) of between 500 and 0 milliseconds. The duration and frequency of the sweeps, and the inter-stimulus interval between the sweeps are varied depending on the processing level of the LLI subject, as will be further described below.

Utilization of up-down frequency sweeps with varying ISI has been fully described in U.S. patent application Ser. No. 08/995,680, entitled "METHOD AND DEVICE FOR ENHANCING THE RECOGNITION OF SPEECH AMONG SPEECH-IMPAIRED INDIVIDUALS", and is hereby incorporated by reference.

The above described methods have been combined in a unique fashion by the present invention to provide an adaptive training method and apparatus for training subjects having abnormal temporal processing abilities to recognize and distinguish short duration acoustic events that are common in speech. More specifically, emphasis has been used to intensify format transitions of stop consonants that are presented to a subject. It is believed that the differential gain of critical acoustic components generates more vigorous neural activity, which leads to better signal differentiation by neural networks involved in speech perception.

The present invention is embodied into a computer program entitled Fast ForWord II by Scientific Learning Corporation. The computer program is provided to an LLI subject via a CD-ROM that is input into a general purpose computer such as that described above with reference to FIG. 1. In addition, a user may log onto a server, via an Internet connection, for example, to upload test results, and to download training parameters for future exercises. Specifics of the present invention will now be described with reference to FIGS. 8–16.

Figure 8:
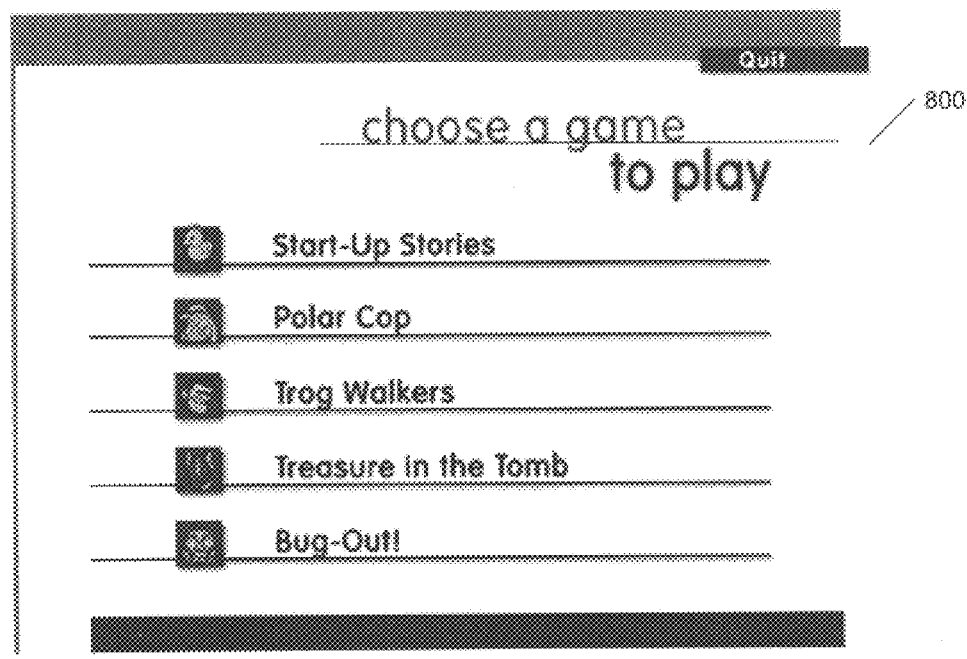
FIG. 8 is a pictorial representation of a game selection screen according to the present invention.

Referring first to FIG. 8, a pictorial representation is shown of a game selection screen 800. The game selection screen 800 is similar to that provided to a subject upon initialization of the computer program according to the present invention. The game selection screen 800 includes the titles of five computer games that provide distinct training exercises for improving language recognition in subjects who abnormally process temporal acoustic events, and for building, or rebuilding the neurological connections necessary to accurately process phonemes at the rates common in speech. The game titles include: 1) Start-Up Stories; 2) Polar Cop; 3) Trog Walkers; 4) Treasure in the Tomb; and 5) Bug-Out!.

When a subject begins execution of the Fast ForWord II computer program, he/she is presented with a screen similar to the screen 800. More specifically, upon initiation of the program, the subject is presented with a screen that lists the subjects that are currently being trained by the program. The subject, or instructor, then selects his/her name from the list.

Once the subject has selected his/her name, a screen similar to 800 appears, typically listing the five programs, according to a training schedule that is dictated by the program, or is modified by an instructor. The order of the games that is presented in the screen 800 may vary from day to day, depending on which games the subject has previously played. In addition, after a subject has completed play of a particular game, that game may be shown "grayed out", indicating that it may not be selected again that day unless all other scheduled exercises have already been played. The subject then selects to play one of the games listed.

In one embodiment, a training schedule is provided by a certified Speech and Language Professional (SLP), and the SLP oversees each training session according to the schedule. An exemplary schedule requires a subject to cycle through the games for an hour and forty minutes, five days per week, for approximately six weeks.

In an alternative embodiment, the game schedule is specified by an SLP at a remote server, and the daily parameters of the schedule are downloaded to the subject's computer, either daily or weekly. The schedule can be optimized over the course of the training program according to the performance or skill of the subject. It can also be used to help manage time in each game so that all of the games are completed in about the same time at the end of the training program. This can be accomplished by an automated computer algorithm that adjusts the time allotted for each training exercise. This algorithm is individually adaptive and can adjust the times for each exercise on an individual subject basis using performance and estimates of time to complete the entire training sequence. Such adaptive timing is disclosed in U.S. patent application Ser. No. 09/400,643, filed Sep. 21, 1999, entitled "METHOD AND APPARATUS FOR COGNITIVE TRAINING OF HUMANS USING ADAPTIVE TIMING OF EXERCISES", and incorporated herein by reference for all purposes. One skilled in the art will appreciate that the training schedule could either be provided in a window on the subject's computer, or could actually control the game selection screen to prompt the user only for those games required on a particular day.

Once a subject selects a particular game, he/she is taken into that particular game's module. Alternatively, once the subject selects his/her name from the list, the particular games may be presented, in a predefined order, without requiring the subject to first select the game.

Each of the games are described in detail in the below listed U.S. patent applications, which are hereby incorporated by reference for all purposes:

| Game | Serial No. (Docket) | Title |
|---|---|---|
| Start-up Stories | 09/106947 (SLC:814) | A METHOD FOR ADAPTIVE TRAINING OF LISTENING AND LANGUAGE COMPREHENSION USING PROCESSED SPEECH WITHIN AN ANIMATED STORY |
| Polar Cop | 09/089149 (SLC:810) | METHOD AND APPARATUS FOR TRAINING OF AUDITORY/VISUAL DISCRIMINATION USING TARGET AND DISTRACTOR PHONEMES/GRAPHEMES |
| Trog Walkers | 09/098199 (SLC:811) | METHOD FOR ADAPTIVELY TRAINING HUMANS TO DISCRIMINATE BETWEEN FREQUENCY SWEEPS COMMON IN SPOKEN LANGUAGE |
| Treasure in the Tomb | 09/105916 (SLC:812) | METHOD FOR TRAINING OF AUDITORY/VISUAL DISCRIMINATION USING TARGET AND FOIL |

| Game | Serial No. (Docket) | Title |
|---|---|---|
| | | PHONEMES/GRAPHEMES WITHIN AN ANIMATED STORY |
| Bug Out! | 09/106939 (SLC:813) | METHOD FOR ADAPTIVE TRAINING OF SHORT TERM MEMORY AND AUDITORY/VISUAL DISCRIMINATION WITHIN A COMPUTER GAME |
| Phonic Words | 08/992072 (SLC:707B) | METHOD AND APPARATUS FOR TRAINING OF COGNITIVE AND MEMORY SYSTEMS IN HUMANS |

The present application provides a detailed description of a performance (or progress) feedback reporting system that has been incorporated into certain products by Scientific Learning Corporation to provide a subject being trained by the products with interactive feedback regarding his/her progress in each of the games. The performance feedback system allows a subject to examine his/her strengths and weaknesses in distinguishing between acoustic sounds that are common in spoken language, and more specifically to determine their overall progress in each of the games, as well as their progress in distinguishing between specific stimulus sets within each of the games. It has been determined that after a subject has become familiar with the games, that they are very interested in, and motivated by, an understanding of their overall progress, as well as their progress in particular games. Moreover, the subjects wish to know where they are having problems, where they are having success, as well as some approximation of how far they have to go. With the above as background, the specific features of the performance feedback mechanism according to the present invention will now be described with reference to FIGS. 9–16.

Figure 9:
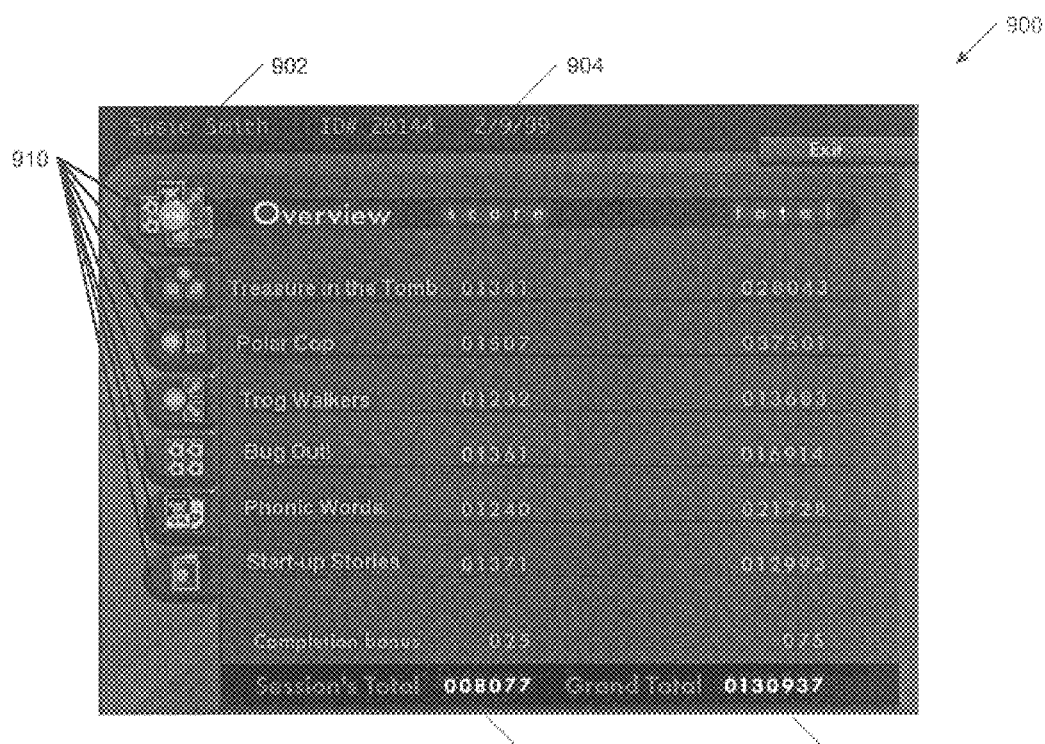
FIG. 9 is a pictorial representation of a performance feedback overview screen according to the present invention.

Referring to FIG. 9, a screen capture is shown of a performance feedback overview screen 900. The overview screen 900 illustrates the name 902 of the subject that is being trained, the date 904 of the last training activity, a session total 906 illustrating the total number of points achieved by the subject on the present day, and a grand total 908 illustrating the total number of points achieved by the subject since s/he began the training program. In addition, tabs 910 are provided to allow the subject to select detailed feedback information for the games available within the training program. The top tab 910 provides the overview screen 900. However, if the subject selects the next tab 910, the subject will be presented with the screen 1000 of FIG. 10, to which attention is now directed.

The screen 1000 provides detailed feedback to the subject regarding his/her progress in the game Treasures in the Tomb. As particularly described in U.S. patent application Ser. No. 09/105,916 referenced above, Treasures in the Tomb tests a subject's ability to distinguish between similarly sounding phonemes and to associate phonemes with their graphemes. Phonemes include consonant (C), consonant-vowel-consonant (CVC), and consonant-vowel-consonant-consonant (CVCC) constructs. The game presents a series of trials that provide target phonemes of processed speech to the subject for identification. As the subject accurately identifies the target phonemes from a similar sounding phoneme (foil), the amount of processing applied to the phonemes is reduced, ultimately to the level of normal speech. The trials are placed within a game environment to entertain and amuse the subject so that multiple iterations are considered enjoyable rather than tedious. For purposes of the present invention, the terms "phoneme" and "word" are used interchangeably, to designate particular aural events that must be perceived by a subject.

The particular phonemes pairs that are presented in the game Treasure in the Tomb are aba-ada, ba-da, be-de, bi-di, and va-fa. Each of these phoneme pairs are presented on the screen 1000 underneath progress bars 1002 representing the subject's progress or success in distinguishing the phonemes in the pair from each other. For example, in the screen 1000, the subject has had the most success distinguishing between the phonemes ba-da. In contrast, the subject has had the least success in distinguishing between the phonemes va-fa.

Next to each of the progress bars 1002 are microphones 1004, 1006. The non-highlighted microphone 1004 allows the subject to play the phoneme pair at the processing level that is the easiest to understand (i.e., the level having the most acoustic processing). This level is typically where a subject begins their training. In one embodiment, the most processing applied to a phoneme pair is 150% stretching, and 20 db emphasis. The second microphone 1006 corresponds to the processing level that has been obtained by the subject after a number of trials. When the subject presses the microphone 1006, they are presented the corresponding phoneme pair at the current processing level. Thus, not only does screen 1000 illustrate for the subject their performance for each of the phoneme pairs, it also provides for interactive selection of microphones 1004, 1006 so that the subject can listen to the phoneme pairs, both at the maximum level of processing, and at the processing level that they have achieved.

Figure 11:
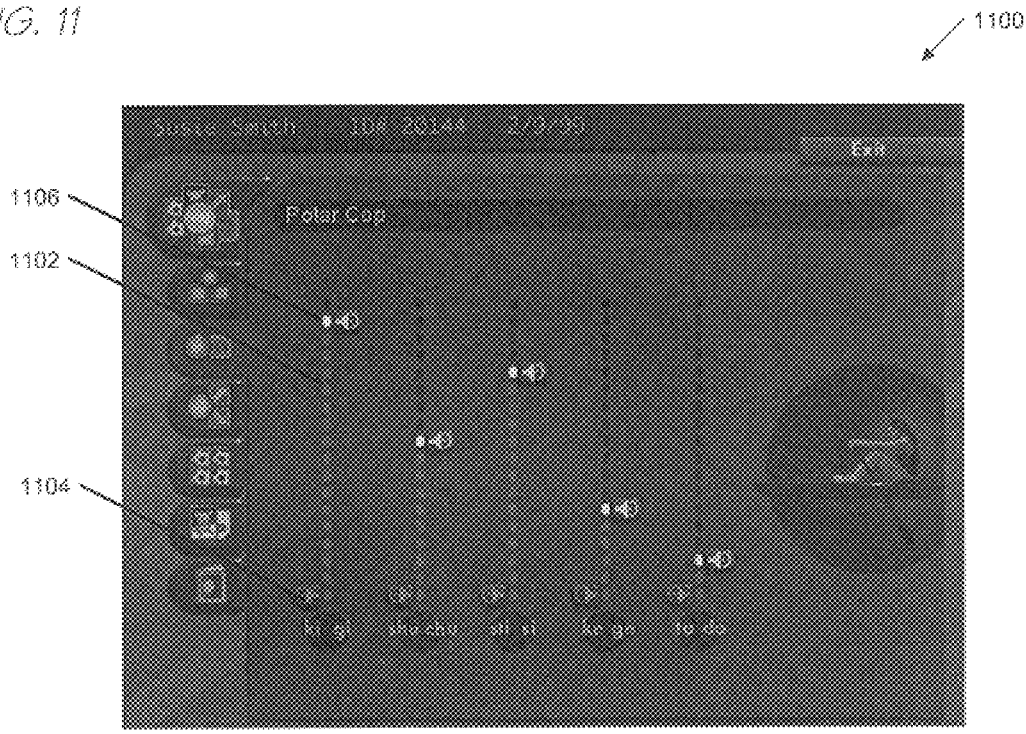
FIG. 11 is a pictorial representation of a detailed performance feedback screen for a game entitled "Polar Cop".

Referring now to FIG. 11, a screen capture is shown of a performance feedback screen 1100. The screen 1100 provides detailed feedback to the subject regarding his/her progress in the game Polar Cop. As particularly described in U.S. patent application Ser. No. 09/089,149 referenced above, Polar Cop is a game that adaptively trains a subject to distinguish between similarly sounding phonemes and to associate phonemes with their graphemes. The game presents a series of trials that provide target phonemes of processed speech to the subject for identification. As the subject accurately identifies the target phonemes within a stream of distractor phonemes, the amount of processing applied to the phonemes is reduced, ultimately to the level of normal speech. In one embodiment, the target/distracter phoneme pairs are: ki-gi, shu-chu, sti-si, ke-ge, and to-do.

Each of these phoneme pairs are presented on the screen 1100 underneath progress bars 1102 representing the subject's progress or success in distinguishing the phonemes in the pair from each other. For example, in the screen 1100, the subject has had the most success distinguishing between the phonemes ki-gi. In contrast, the subject has had the least success in distinguishing between the phonemes to-do.

Figure 10:
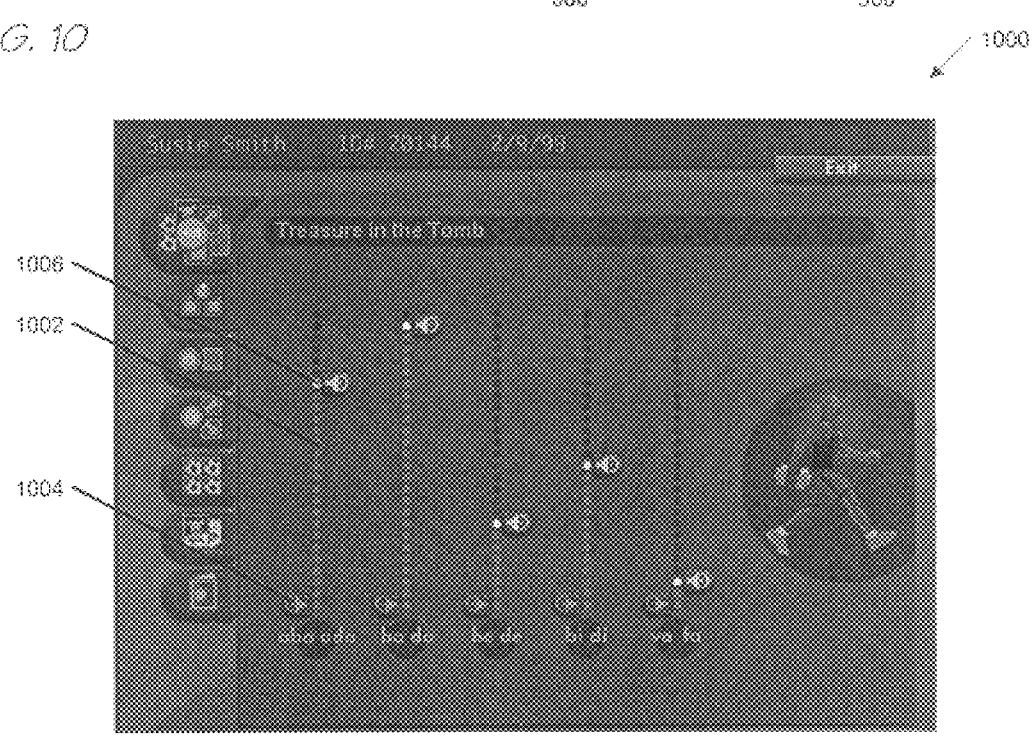
FIG. 10 is a pictorial representation of a detailed performance feedback screen for a game entitled "Treasure in the Tomb".

As in FIG. 10, next to each of the progress bars 1102 are microphones 1104, 1106. The non-highlighted microphone 1104 allows the subject to play the phoneme pair at the processing level that is the easiest to understand. This level is typically where a subject begins their training. The second microphone 1106 corresponds to the processing level that has been obtained by the subject after a number of trials. When the subject presses the microphone 1106, they are presented the corresponding phoneme pair at the current processing level. Thus, not only does screen 1100 illustrate for the subject their performance for each of the phoneme pairs, it also provides for interactive selection of microphones 1104, 1106 so that the subject can listen to the phoneme pairs, both at the maximum level of processing, and at the processing level that they have achieved.

Figure 12:
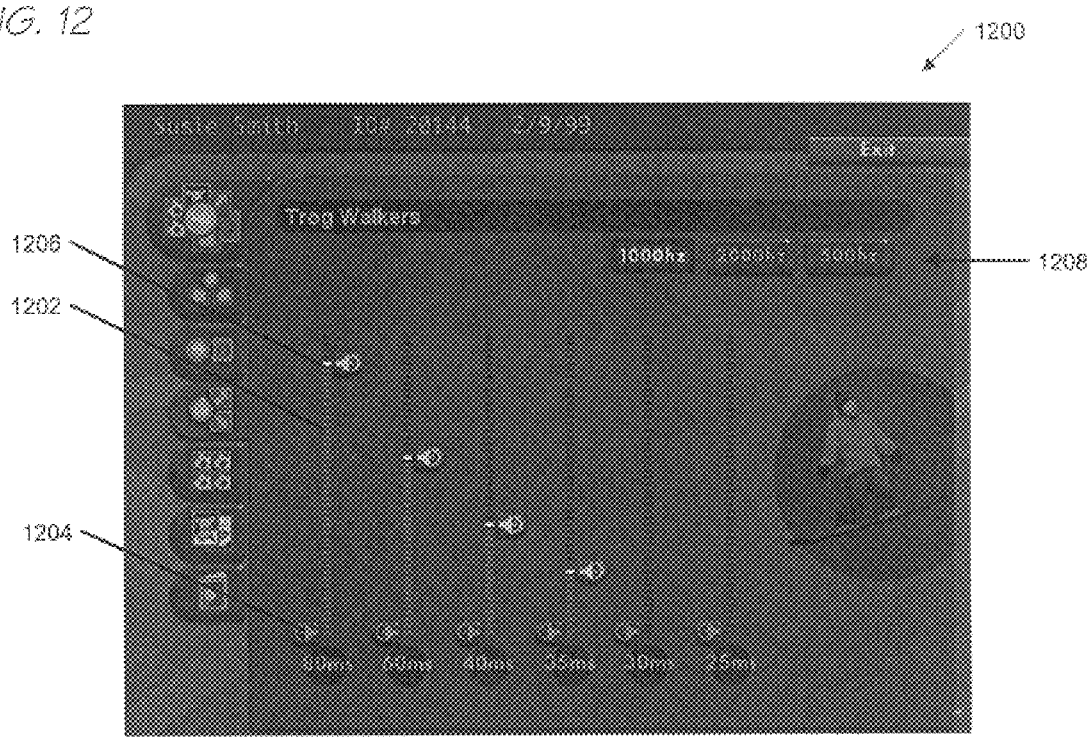
FIG. 12 is a pictorial representation of a detailed performance feedback screen for a game entitled "Trog Walkers".

Referring now to FIG. 12, a screen capture is shown of a performance feedback screen 1200. The screen 1200 provides detailed feedback to the subject regarding his/her progress in the game Trog Walkers. As particularly described in U.S. patent application Ser. No. 09/098,199 referenced above, Trog Walkers is a game that adaptively trains a subject to distinguish between upward and downward frequency sweeps that are common in the stop consonant portion of phonemes, by varying the duration and frequency of the sweeps, and by varying the inter-stimulus interval (ISI) between presentation of the sweeps. More specifically, the game presents a series of trials that provide sequences of upward/downward going frequency sweeps to the subject for identification. As the subject accurately identifies the upward/downward frequency sweeps, the ISI separating the sweeps is reduced, and the duration of the sweeps is reduced, ultimately to the level of normal speech.

Each of the sweep durations that are tested appear at the bottom of the screen 1200 underneath progress bars 1202 representing the subject's progress or success in distinguishing between the upward/downward sweeps for a given duration. For example, in the screen 1200, the subject has had the most success distinguishing between upward/downward frequency sweeps having a duration of 80 ms. In contrast, the subject has had the least success in distinguishing between upward/downward frequency sweeps having a duration of 35 ms. In one embodiment, the subject is not allowed to proceed to upward/downward frequency sweeps having duration of less than 35 ms until their success at 35 ms improves. For details of how a subject progresses thru the various skill levels, the reader is directed to U.S. Patent Ser. No. 09/098,199.

As in FIGS. 10 and 11, next to each of the progress bars 1202 are microphones 1204, 1206. The non-highlighted microphone 1204 allows the subject to play the upward/downward frequency sweep of an associated duration (e.g., 80 ms) with a maximum separation between the sweeps (e.g., 500 ms). This level is typically where a subject begins their training. The second microphone 1206 corresponds to the processing level that has been obtained by the subject after a number of trials. When the subject presses the microphone 1206, s/he is presented with an upward/downward sweep, at the associated duration, at the current processing level (the sweeps separated by an interstimulus interval of 50 ms, for example).

Figure 13:
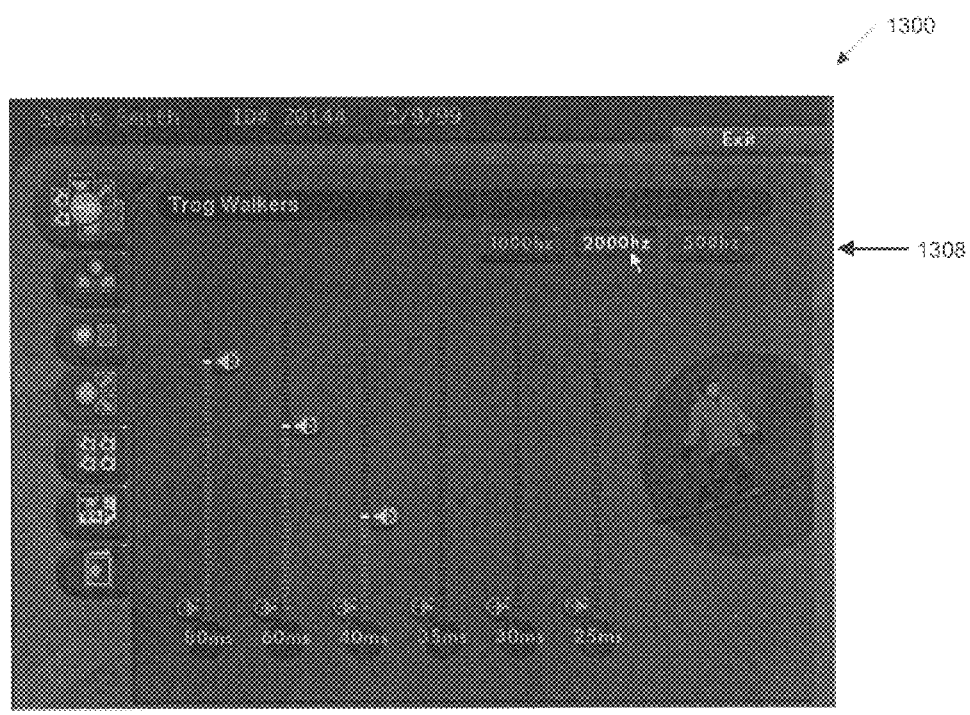
FIG. 13 is a pictorial representation of a detailed performance feedback screen for a game entitled "Trog Walkers", illustrating a subject's progress at an alternative frequency.

In addition, the screen 1200 provides three buttons 1208 for selecting test results for the three tested frequencies in Trog Walkers, 1000 hz, 2000 hz and 500 hz. In FIG. 12, the subject's test results are shown for upward/downward frequency sweeps around 1000 hz. Referring to FIG. 13, a screen 1300 is shown, similar to screen 1200. In screen 1300, however, the test results shown are for upward/downward frequency sweeps around 2000 hz, as selected by the 2000 hz button 1308. Thus, the performance feedback screens for Trog Walkers provides a subject with information regarding his/her progress in distinguishing between upward/downward frequency sweeps of varying duration, and of varying frequency.

Figure 14:
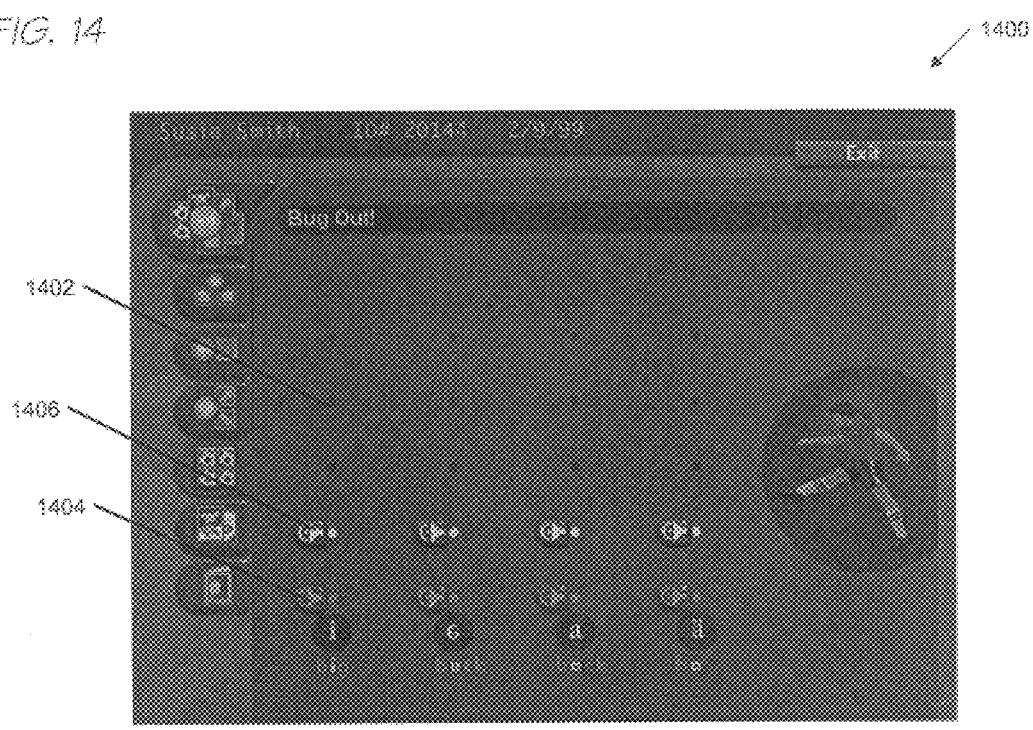
FIG. 14 is a pictorial representation of a detailed performance feedback screen for a game entitled "Bug Out!".

Referring now to FIG. 14, a screen capture is shown of a performance feedback screen 1400. The screen 1400 provides detailed feedback to the subject regarding his/her progress in the game Bug Out! As particularly described in U.S. patent application Ser. No. 09/106,939 referenced above, Bug Out! is a game that adaptively trains a subject to distinguish between similarly sounding phonemes and to associate phonemes with their graphemes. Phonemes include words with three to five letters having consonant (C), consonant-vowel-consonant (CVC), and consonant-vowel-consonant-consonant (CVCC) constructs. The game presents a grid having matching pairs of phonemes (and associated graphemes). When a subject selects an element on the grid, its phoneme is presented aurally. In addition, its associated grapheme is presented. When the subject uncovers an element that corresponds to one previously heard/uncovered, the subject is to match the current element with the prior element. As the subject accurately identifies the previously selected elements with the current elements, the amount of processing applied to the phonemes is reduced, ultimately to the level of normal speech.

The object of the Bug Out! game is to match pairs of sounds and their associated graphemes, and in so doing clear the playing field of tiles. Each of the tiles represent a phoneme/grapheme. When a tile is selected, its phoneme is played, and its grapheme is displayed. The tile remains uncovered illustrating its associated grapheme. As the subject uncovers tiles s/he will uncover tiles that match previously uncovered tiles. The subject then selects the matching tile to remove the pair from the playing field.

In Bug Out! one of the stimulus sets includes the words big, buck, back, and ba. These words are shown at the bottom of screen 1400. Above each of the words are a performance bar 1402, along with microphones 1404, 1406. The microphones 1404, 1406 allow a subject to have presented the words corresponding to the bar 1402, at the processing levels obtained by the subject, in the manner described above.

Figure 15:
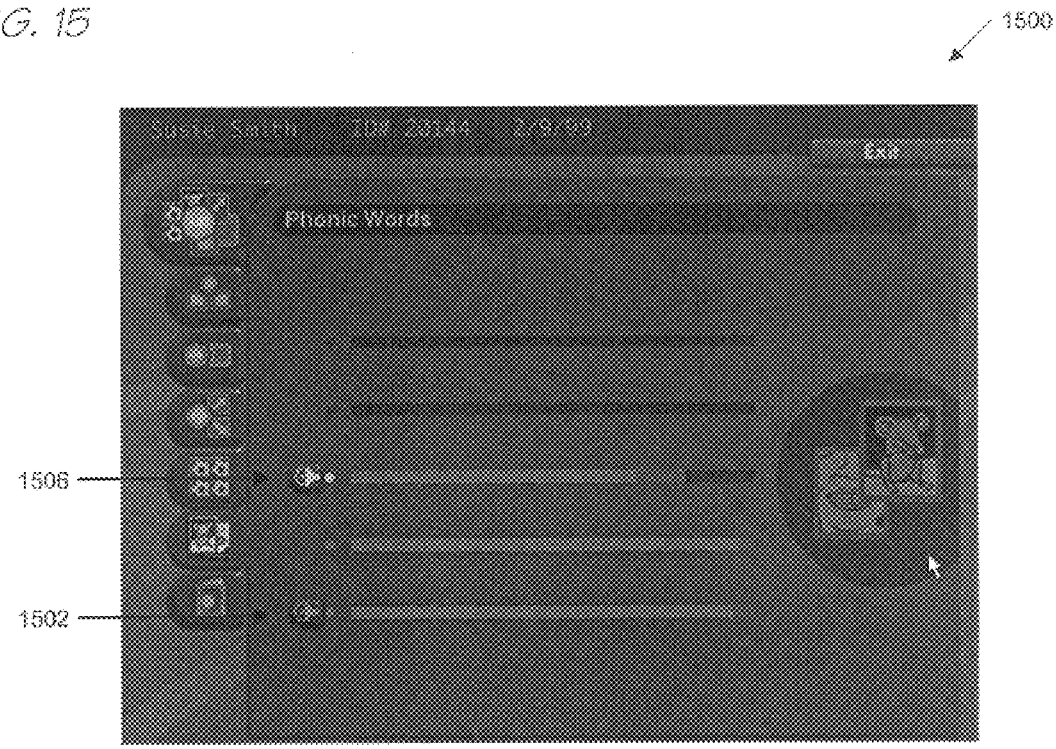
FIG. 15 is a pictorial representation of a detailed performance feedback screen for a game entitled "Phonic Words".

Referring now to FIG. 15, a screen capture is shown of a performance feedback screen 1500. The screen 1500 provides detailed feedback to the subject regarding his/her progress in the game Phonic Words. As particularly described in U.S. patent application Ser. No. 08/992,072 referenced above, Phonic Words is a game that presents a subject with a sentence prompt that requires the subject to distinguish between two similar words, and to accurately select one of two pictures corresponding to the words using a selection hand. The first word in the pair is always the correct answer, but its representational image could appear on the left or right of the screen The screen 1500 contains horizontal progress bars 1502 for illustrating a subject's progress in distinguishing between the phoneme pairs, for a number of different processing levels. The easiest processing level (the level having the most acoustic processing) is represented by the bottom bar 1502. As the subject correctly distinguishes between phonemes, the bottom bar 1502 is filled in. As the subject advances through the various processing levels, the bars above the bottom bar are filled in, accordingly. If the subject wishes to determine what their present skill level is, they can select the microphone 1506, and a phoneme pair will be presented at the current processing level.

Figure 16:
FIG. 16 is a pictorial representation of a detailed performance feedback screen for a game entitled "Start-up Stories".

Referring now to FIG. 16, a screen capture is shown of a performance feedback screen 1600. The screen 1600 provides detailed feedback to the subject regarding his/her progress in the game Start-up Stories. As particularly described in U.S. patent application Ser. No. 09/106,947 referenced above, Start-Up Stories is a game that adaptively trains subjects to improve their ability to parse grammatical constructs, exercises their verbal serial memory, improves their ability to follow complex story lines, and aids in developing listening comprehension. As in the other games mentioned above, Start-Up Stories utilizes acoustic processing to enhance a subject's ability to accurately distinguish between similar sounding phonemes, but the processing is applied to command sentences rather than to individual phonemes. More specifically, Start-Up Stories presents 3 stories to a subject: Chicken Licken, The Big Bad Pigs, and Little Red and the Wolf. Each story consists of four installments, with each installment provided in the following sequence: 1) Narration; 2) Listening Comprehension (LC); 3) Language Comprehension Builder (LCB); and 4) Block Commander (BC).

The Narration installment auditorily and graphically presents a portion of the story to the subject. The subject's task in this installment is to listen carefully to the narration. S/he will not be able to repeat sections of the story, so s/he must listen carefully the first time. Listening Comprehension asks the subject to perform activities that test his/her comprehension of the just narrated installment. For example, in Chicken Licken, the subject will hear questions such as "Who was sitting in the tree?", and "What did Chicken Licken say was falling?" In one embodiment, 4 questions are asked within Listening Comprehension for each narration installment. Language Comprehension Builder asks the subject to perform activities that test his/her comprehension of individual sentences. Block Commander asks the subject to perform tasks on a computer screen in response to sentence directions.

In one embodiment, the performance of a subject on screen 1600 is reported for the games Block Commander, shown by progress bars 1603 and Language Comprehension Builder shown by progress bars 1602, but not for Listening Comprehension. When the subject begins, all of the progress bars 1602, 1603 are not highlighted. Advancement causes the lower bars 1602, 1603 to become highlighted, as in screen 1500. At any time, the subject can check their performance in the screen 1600, and can select the microphone 1606 corresponding to their current processing level.

Figure 17:
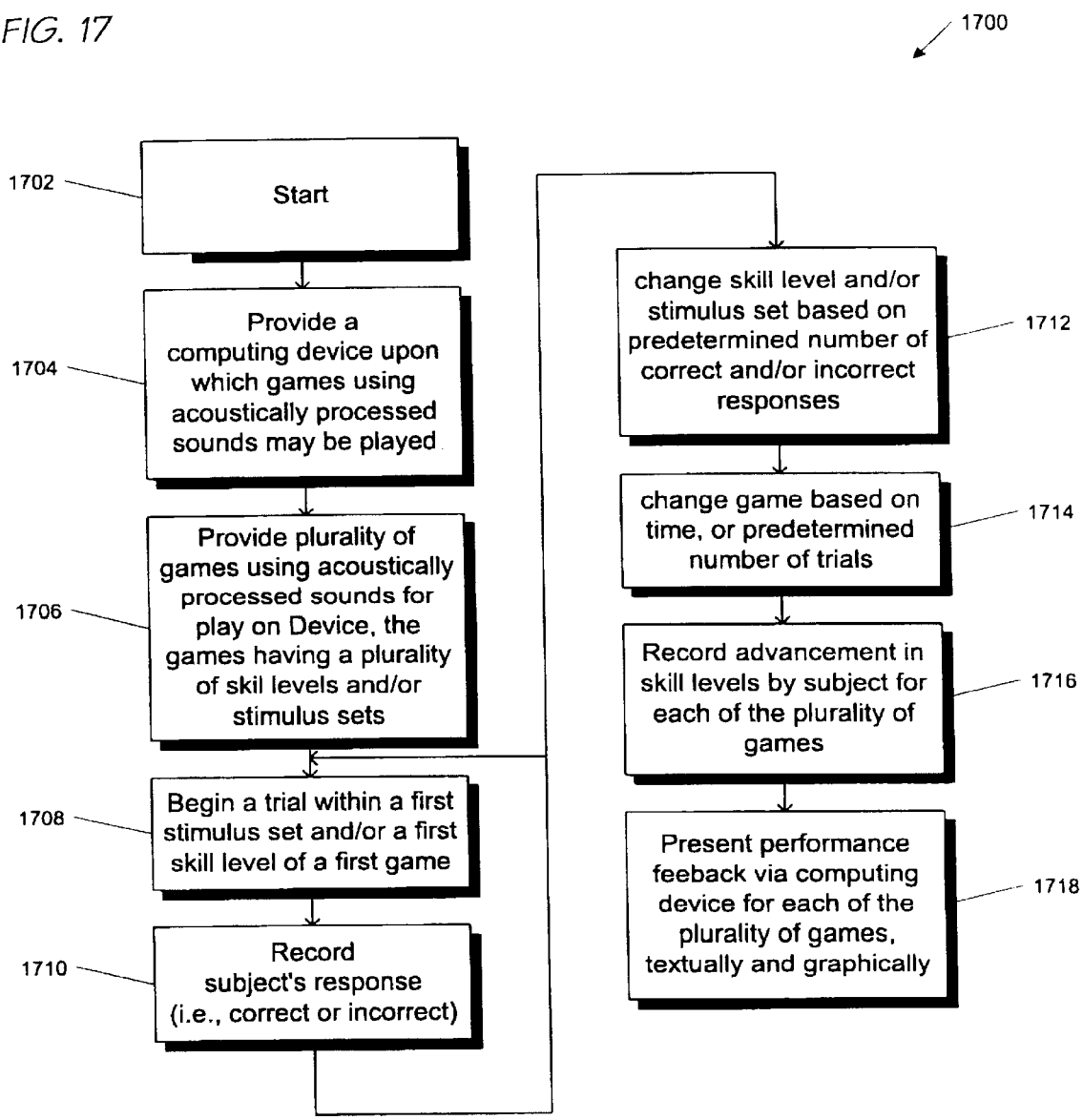
FIG. 17 is a flow chart illustrating the recordation and display of the performance feedback according to the present invention.

Referring now to FIG. 17, a flow chart 1700 is provided illustrating the steps associated with the performance feedback mechanism discussed above. The flow begins at block 1702 and proceeds to block 1704.

At block 1704, a computing device, such as that shown in FIG. 1, is provided to a user. The computing device contains a plurality of games such as those referenced in FIG. 8. Flow then proceeds to block 1706.

At block 1706, the games stored on the computing device are provided to a subject, via a screen similar to that shown in FIG. 8. As thoroughly described in the applications referenced above in the Cross Reference to Related Applications, each of the games contains a plurality of stimulus sets, and a plurality of skill levels, for developing a subject's ability to distinguish between short duration acoustic events common in spoken language. Flow then proceeds to block 1708.

At block 1708 a trial is presented to a subject. The trial is related to a first stimulus set, at a first skill level, within a first game. In one instance, the subject responds to the trial by selecting a button on the computing device, or pressing a mouse button, for example. As described in the related applications, each of the plurality of games presents different trials, which are responded to correctly, or incorrectly, based on the type of game being played, the stimulus set being presented, and/or the skill level obtained by the subject. After the trial is presented, flow proceeds to block 1710.

At block 1710, the subject's response to the trial is recorded (i.e., did the subject respond correctly or incorrectly to the trial?). Flow then proceeds back to block 1708 to begin a new trial within the same skill level, within the same stimulus set. In addition, flow proceeds to block 1712.

At block 1712, each of the plurality of games chooses to change the skill level, and/or a stimulus set, for the next trial based on a predetermined number of correct/incorrect responses. Details relating to the adaptive methodology of skill level and/or stimulus set change are thoroughly described in the parent applications upon which this application is based. Flow then proceeds to block 1714.

At block 1714 the game being played is changed, based on the length of time the previous game has been played, and/or based on a predetermined number of trials, correct or incorrect. One skilled in the art will appreciate that the steps outlined in blocks 1712 and 1714 operate in parallel to the presentation of trials described in blocks 1708 and 1710. Flow then proceeds to block 1716.

At block 1716, the subject's advancement in skills levels is recorded for each of the plurality of games for which trials have been responded to. Flow then proceeds to block 1718.

At block 1718, performance feedback is provided via the computing device for each of the plurality of games. The performance feedback is shown textually, and or graphically, as described above with reference to FIGS. 9–16.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

More specifically, the performance feedback mechanism discussed above has been illustrated with respect to particular acoustic discrimination games embodied within a product called Fast Forward II. One skilled in the art should appreciate that the novel features of the performance feedback system are not restricted to these games, but are applicable to any phonological and auditory training games where phonemes are acoustically manipulated to assist in training a subject to accurately discriminate.

We claim:

1. A method on a computing device for providing performance feedback to a subject related to the subject's progress in a plurality of games, the games designed to improve the subject's signal differentiation in spoken language, the games utilizing speech processing for enhancing the subject's ability to distinguish between similar phonemes, the games using a plurality of stimulus sets, the method comprising:

for each of the plurality of games, presenting a plurality of trials to the subject, the trials requiring the subject to indicate a response, the response being correct or incorrect for each trial;

recording for each trial, whether the subject's response was correct or incorrect;

repeating said steps of presenting and recording for a number of trials within each of the plurality of stimulus sets, within each of the plurality of games; and graphically presenting to the subject a chart illustrating the subject's performance for ones of the plurality of stimulus sets.

2. The method as recited in claim 1 wherein the subject indicates a response to the trials by pressing an input button coupled to the computing device.

3. The method as recited in claim 1 wherein a plurality of trials are presented for each of the plurality of stimulus sets.

4. The method as recited in claim 1 wherein said step of recording further comprises:

recording a skill level obtained by the subject, for each of the plurality of stimulus sets, the skill level determined by the subjects correct and incorrect responses to the trials.

5. The method as recited in claim 4 wherein said step of graphically presenting to the subject a chart further comprises:

presenting a chart illustrating the recorded skill level obtained by the subject for each of the plurality of stimulus sets.

6. The method as recited in claim 5 wherein said step of presenting a chart illustrating the recorded skill level further comprises:

providing selection buttons on the chart that upon selection by the subject, acoustically reproduces one of the stimulus sets at the subject's presently obtained skill level.

\* \* \* \* \*